United States Patent
Lee et al.

[11] Patent Number: 6,108,791
[45] Date of Patent: Aug. 22, 2000

[54] PASSWORD PROCESSING APPARATUS AND METHOD

[75] Inventors: Jin-chul Lee, Anyang; Byung-gul Lim, Suwon, both of Rep. of Korea

[73] Assignee: Samsung Electronics Co., Ltd., Kyungki-do, Rep. of Korea

[21] Appl. No.: 09/052,016

[22] Filed: Mar. 31, 1998

[30] Foreign Application Priority Data

Apr. 1, 1997 [KR] Rep. of Korea .................. 97/12057

[51] Int. Cl.⁷ ..................... G06F 11/30; G06F 12/14
[52] U.S. Cl. ............................... 713/202; 713/183
[58] Field of Search ................... 713/200, 201, 713/202, 183, 184; 707/9; 705/18; 711/164

[56] References Cited

U.S. PATENT DOCUMENTS

| | | | |
|---|---|---|---|
| 5,226,080 | 7/1993 | Cole et al. | 380/25 |
| 5,375,243 | 12/1994 | Parzych et al. | 395/725 |
| 5,544,083 | 8/1996 | Iizuka et al. | 364/709.01 |

OTHER PUBLICATIONS

O–mu K.K. Company, "Electronic Information Communication Handbook (vol. No. 1)", First Edition, Second Printing (Apr. 30,1990) p. 358.

*Primary Examiner*—Robert W. Beausoliel, Jr.
*Assistant Examiner*—Scott T. Baderman
*Attorney, Agent, or Firm*—Sughrue, Mion, Zinn Macpeak & Seas, PLLC

[57] ABSTRACT

A password processing apparatus and method is provided in which a generic password or master password, in addition to an actual password, is written and verified by using an external memory device. The password processing apparatus includes an internal memory for storing an input password and a condition to read or record a generic password, a detachable storing medium, and an adaptor for writing data to and reading data from the detachable storage medium. A controller stores the password and the condition to read or record the generic password in the memory, stores the generic password in the storage medium according to the condition if the storage medium is connected to the adaptor, and compares the generic password stored in the storage medium with an input password if the input password is different from the password stored in the memory. As a result, by writing and reading an generic password to and from an external memory device using a computer or a program, utility and security of the password can be improved.

4 Claims, 4 Drawing Sheets

PASSWORD PROCESSING APPARATUS AND METHOD

BACKGROUND OF THE INVENTION

1. Field of the Invention

The present invention relates to a password processing apparatus and method, and more particularly, to a password processing apparatus and method in which a generic or master password, in addition to an actual password, is written and verified using an external memory device.

2. Description of the Related Art

In general, a computer or a computer program may require a user to input a password to gain access. Further, where a single computer or program is shared by multiple users, each individual user may have their own password. Accordingly, when a user intends to use a computer or a program but enters an incorrect password, the user is denied access. Thus, in order to prevent forgetting the password, users tend to set obvious passwords, use the same password for a long time, and/or leave passwords written down on paper. However, these practices cause undesirable security risks.

SUMMARY OF THE INVENTION

To solve the above-described problem, it is an objective of the present invention to provide a password processing apparatus in which an additional password (such as a generic password or master password), in addition to an actual password, is written and verified by using an external memory device, thereby improving utility and security of passwords.

It is another objective of the present invention to provide a password processing method by which an additional password (generic password or master password), in addition to an actual password, is written and verified using an external memory device, thereby improving utility and security of passwords.

In accordance with the objectives of the present invention, there is provided a password processing apparatus comprising a memory for storing an input password and a condition to record a generic password; a storing medium which is attachable and detachable; an adaptor for writing or reading data to or from the storage medium; and a controller for storing the password and the condition to read the generic password in the memory, storing the generic password in the storage medium according to the condition if the storage medium is connected to the adaptor, reading the generic password from the storage medium if an input password is different from the password stored in the memory, and verifying the password when the input password is the same as the generic password read from the storage medium.

In accordance with the objectives of the present invention, there is provided a password processing method for writing a password using a memory for storing data, a detachable storage medium, and an adaptor for writing data to and reading data from the storage medium, the writing method comprising the steps of: (a) receiving a condition to record a generic password; (b) writing the generic password to the storage medium according to the condition, if the detachable storage medium is connected to the adaptor; and (c) storing the condition in the memory.

In accordance with the objectives of the present invention, there is provided a password processing method for reading a password using a memory for storing data, a detachable storage medium and an adaptor for writing data to and reading data from the storage medium, the reading method comprising the steps of: (a) checking whether the storage medium is connected to the adaptor, if a condition to read a generic password is stored in the memory; (b) searching the generic password from the storage medium according to the condition recorded in the memory if the detachable storage medium is connected to the adaptor in the step (a); and (c) reading the generic password from the detachable storage medium if the generic password is searched according to the condition.

In accordance with the objectives of the present invention, there is provided a password processing method for verifying a password using a memory for storing data, an attachable and detachable storage medium and an adaptor for writing or reading data to or from the storage medium, the method comprising the steps of (a) comparing an input password with a password stored in the memory; (b) checking whether or not a condition to record the generic password is stored in the memory if the two compared passwords are different in the step (a); and (c) reading the generic password from the storage medium according to the condition, if the condition to record the generic password is stored in the memory in the step (b); and (d) verifying the password if the input password is the same as the generic password read in the step (c).

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Figure 1:
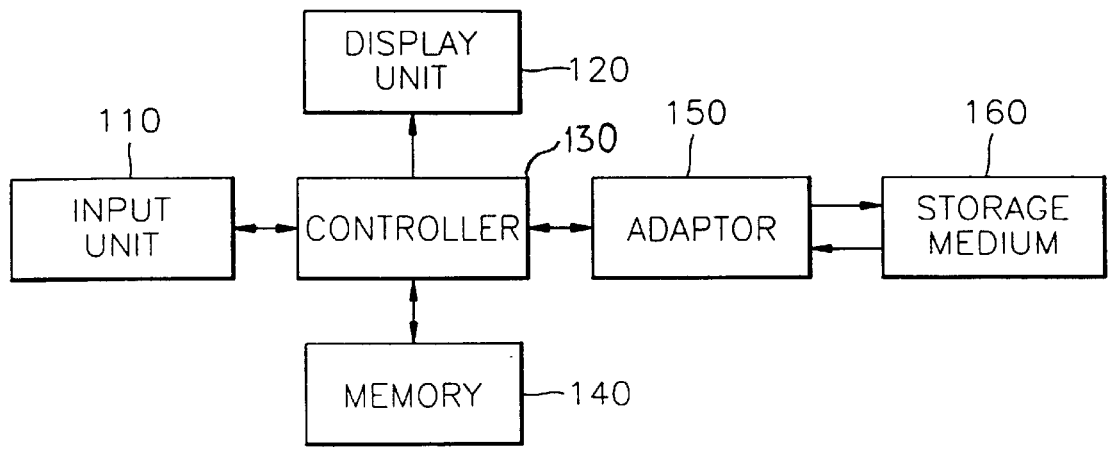
FIG. 1 is a block diagram of a password processing apparatus according to the present invention.

As shown in FIG. 1, a password processing apparatus according to the present invention includes an input unit 110, a display unit 120, a controller 130, a memory 140, an adaptor 150, and a storage medium 160 serving as an external memory device.

The input unit 110 receives an actual password which includes characters or numbers, a generic password, and a condition to record the generic password. Here, the condition may be designated as a file name or a file password. Further, when the generic password is stored in an external memory device, a specific file name which a user wants to read or a predetermined password may be the condition. The memory 140 stores the actual password and the condition to read or write the generic password under the control of the controller 130. The adaptor 150 writes to and reads from the storage medium the generic password under the control of the controller 130.

The storage medium 160, an external memory device (for example, floppy disk), is a an attachable and detachable storage device which is connected to the adaptor 150 or detachable therefrom. The controller 130 stores the actual password input from the input unit 110 and the condition to record the generic password from or to the input unit 110, which has been input from the input unit 110, in the memory 140. Also, the controller 130 writes or reads the generic password to or from the storage medium 160 according to the stored condition when the storage medium 160 is connected to the adaptor 150, and compares a password input from the input unit 110 with the actual password stored in the memory 140, and a password input from the input unit 110 with the generic password read from the recording medium 160.

Figure 2:
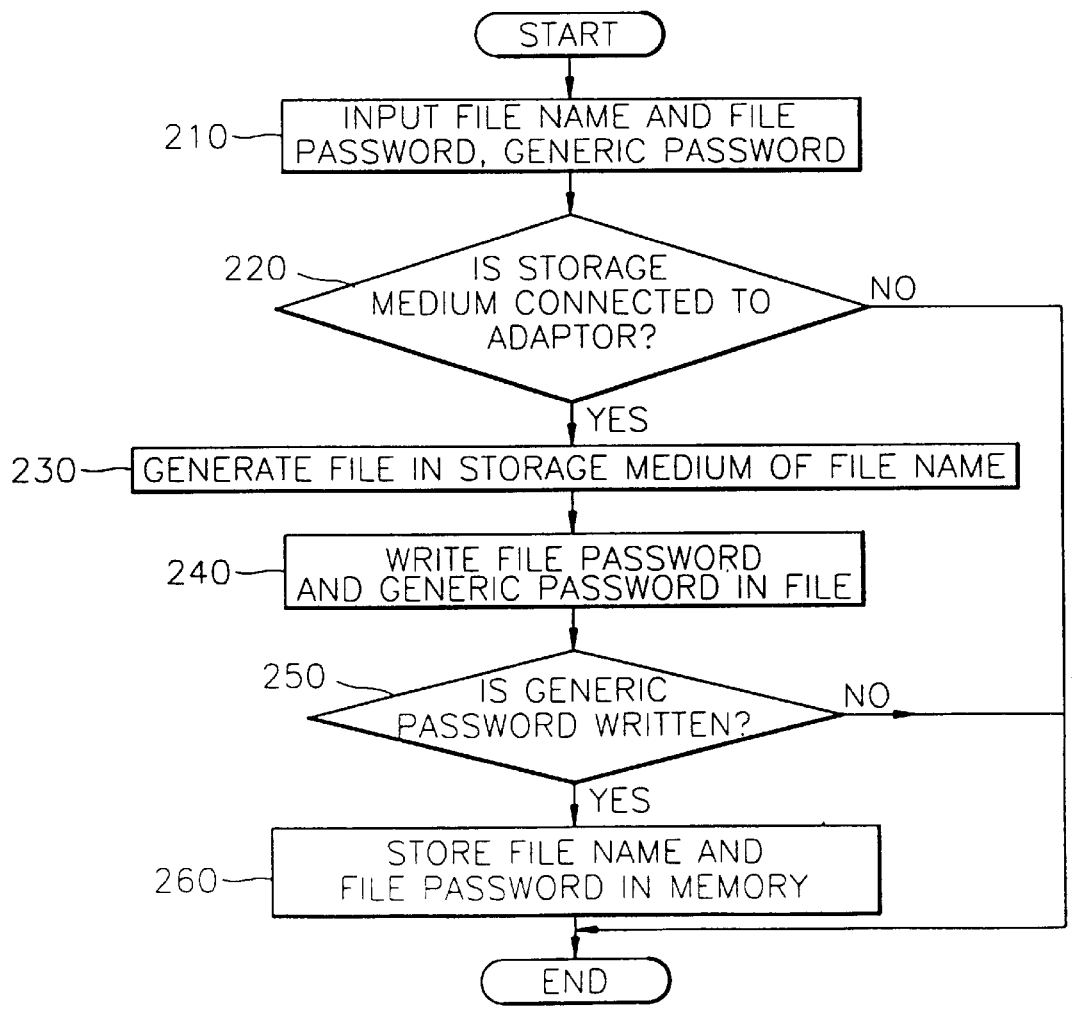
FIG. 2 is a flowchart illustrating a method for recording a generic password according to the present invention.

FIG. 2 is a flowchart illustrating a method for recording a generic password in the storage medium according to the present invention. First, a condition to record a generic password, a file name and a file password are input by a user via the input unit 110 (step 210). Then, it is checked whether or not the storage medium 160 is connected to the adaptor 150 (step 220). If the storage medium 160 is connected to the adaptor 150, a file matching the name input from the input unit 110 is generated in the storage medium 160 (step 230). After generating the file, the file password of the generated file and the generic password are written to the generated file (step 240). It is checked whether or not the generic password is written correctly (step 250). If the generic password is written to the generated file, the file name containing the generic password, and the file password are stored in the memory 140 (step 260). Here, the file name and the file password stored in the memory 140 are used when the controller 130 reads the generic password.

Figure 3:
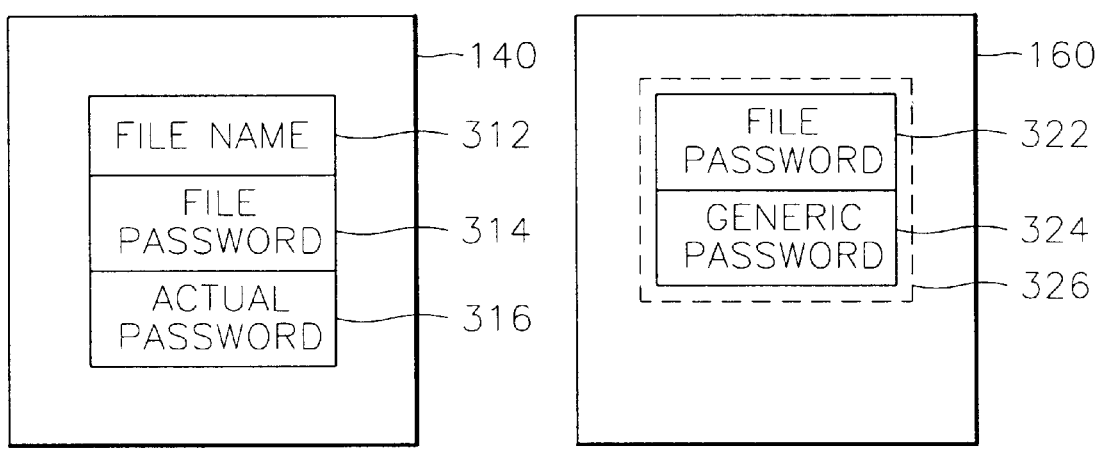
FIG. 3 shows the contents recorded in a memory and a storage medium shown in FIG. 1.

FIG. 3 shows the contents written to the memory 140 and the storage medium 160 of FIG. 1. A file name 312 of a file containing the generic password and a file password 314 are stored in the memory 140. The storage medium 160 stores a file 326 with a designated name in which a file password 322 and a generic password 324 are written. The memory 140 may also store an actual password 316.

Figure 4:
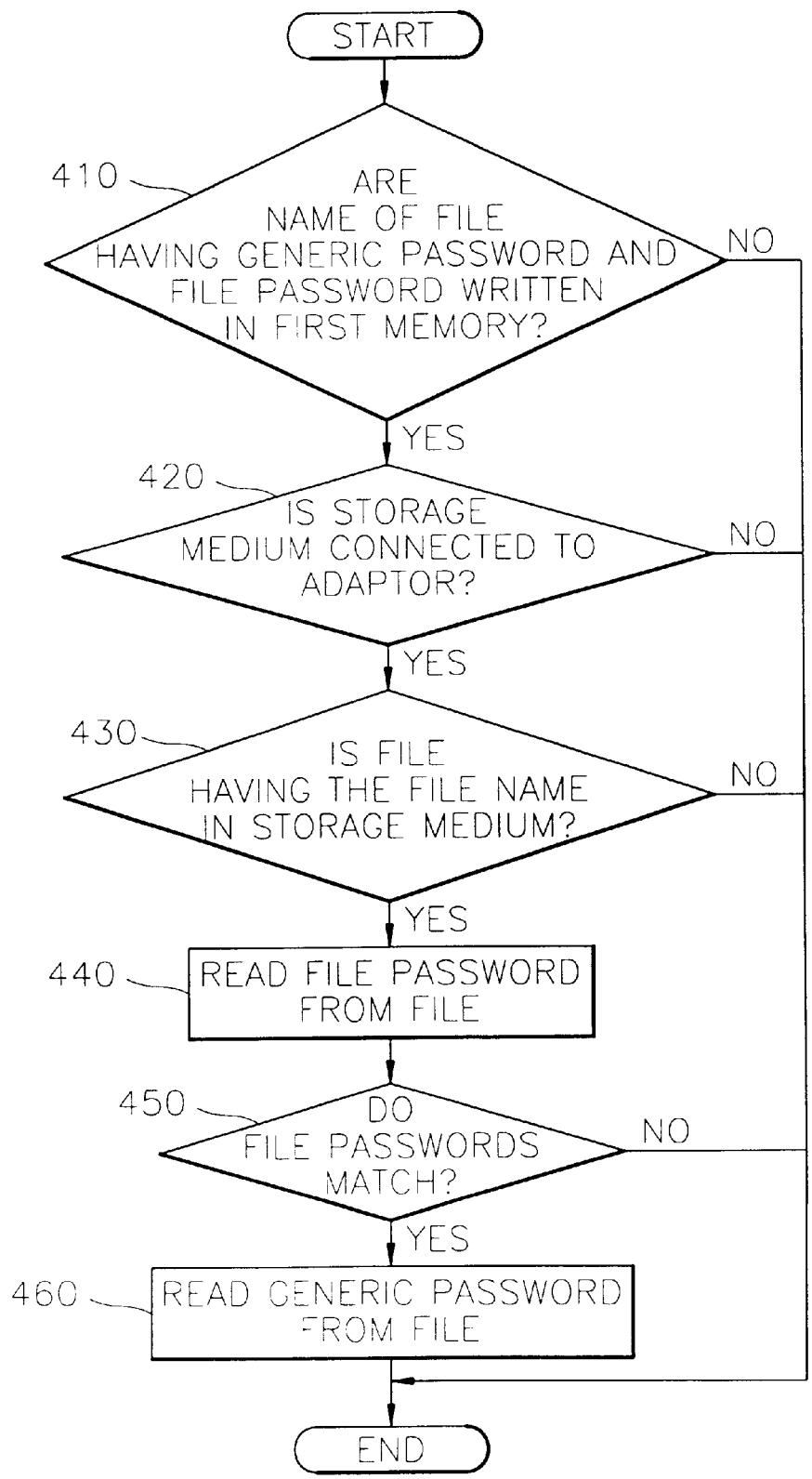
FIG. 4 is a flowchart illustrating a method for reading the generic password according to the present invention.

FIG. 4 is a flowchart illustrating a method for reading the generic password from the storage medium 160 according to the present invention.

First, when a password input by a user is different from a password stored in the memory 140, it is checked whether the file name 312 of the file involving the generic password and the file password 314 are stored in the memory 140 (step 410). If the file name 312 and the file password 314 related to the generic password are stored in the memory 140, it is checked whether or not the storage medium 160 is connected to the adaptor 150. If the storage medium 160 is connected to the adaptor 150, it is checked whether the file 326 storing the generic password 324, with the file name 312 written in the memory 140, is in the storage medium 160 (step 430). If the file 326 exists in the storage medium 160, the file password 322 stored in the file 326 is read (step 440). Then, the file password 314 written to the memory 140 is compared with the read file password 322 (step 450). If the two file passwords are the same, the generic password 324 is read from the file 326 of the storage medium 160.

Figure 5:
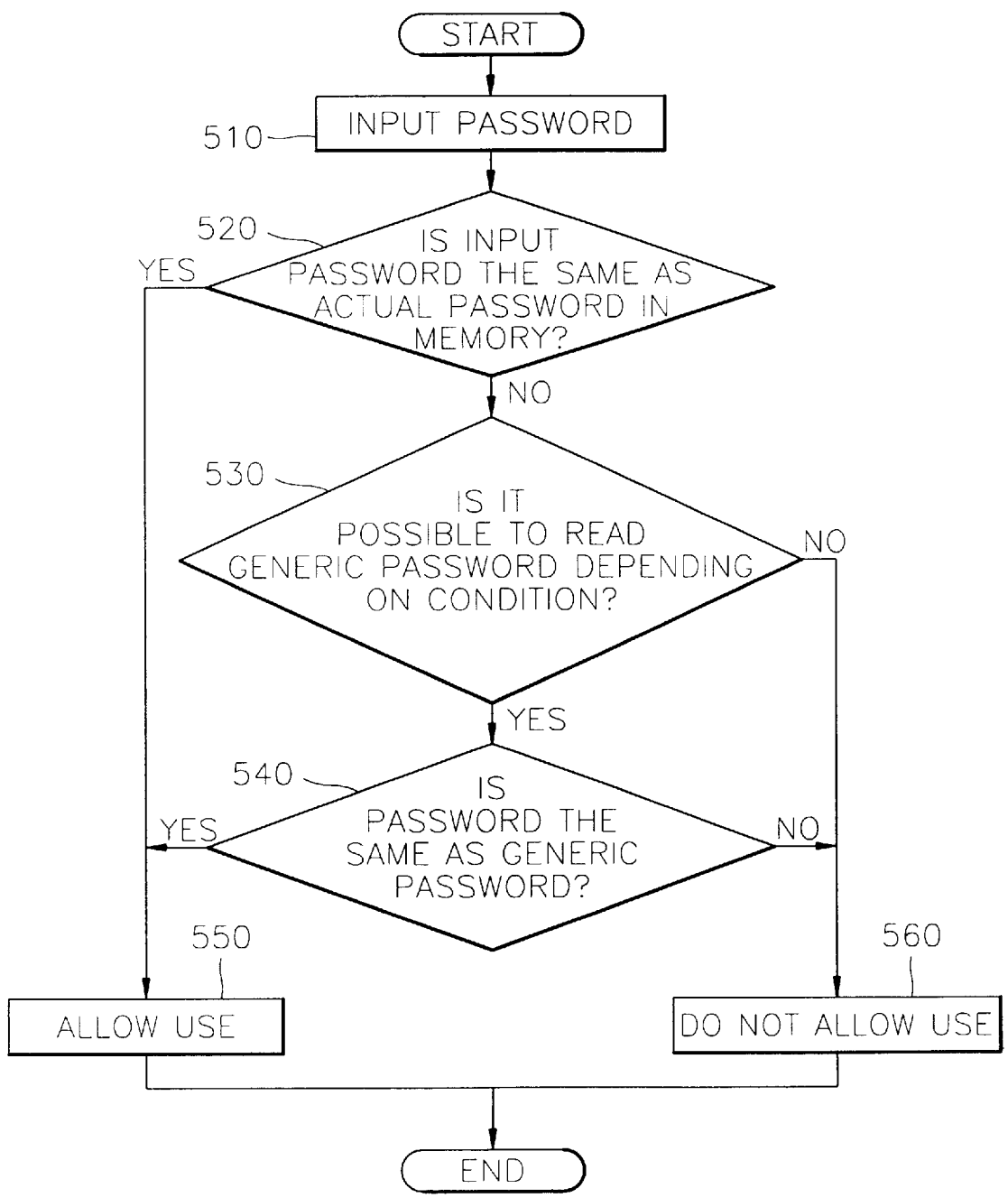
FIG. 5 is a flowchart illustrating a method for verifying a password by the controller shown in FIG. 1.

FIG. 5 is a flowchart illustrating a method for verifying a password according to the present invention.

First, a user inputs a password via the input unit 110 (step 510). Then, the input password is compared with the actual password 316 stored in the memory 140 (step 520). If the input password is the same as the actual password 316 stored in the memory 140, use of the computer is allowed (step 550). However, if the input password is not the same as the actual password 316 stored in the memory 140, it is checked whether the storage medium 160 is connected to the adaptor 150 and the condition to read the generic password is stored in the memory 140 (step 530). If the generic password is read according to the condition to record the generic password, the input password corresponding to the read generic password is compared with the read generic password (step 540). If the input password is the same as the generic password, use of the computer is allowed (step 550). However, if the input password is different from the generic password, use of the computer is not allowed (step 560).

The present invention is not limited to the above embodiment, and further modifications and alterations within the spirit and scope of this invention will occur to those skilled in the art. That is, a generic password other than an existing password for using a computer, a program installed in a computer, or a program on a network may be written in an external memory device such as floppy disk.

As described above, by storing a generic password safely and securely in an external storage medium, it is possible to use a computer or a computer program even if a user forgets their password. When administrating many computers individually used by many users, administrators can access the computer or the program by setting another password even though they do not know the passwords of the individual computers. Also, a condition to process the generic password is set within the computer, so that unauthorized use of the generic password is prevented, thereby improving security. Also, the user can frequently change his password without concern about forgetting the password, and security is maintained because there is no need to write down the password.

What is claimed is:

1. A password processing apparatus comprising:
   an internal memory for storing a password and a condition to read a generic password;
   an external storage medium which is detachable;
   an adaptor for writing data to and reading data from the external storage medium; and
   a controller for storing in the internal memory the password and the condition to read the generic password, storing the generic password in the external storage medium in accordance with the condition to read the generic password if the storage medium is connected to the adaptor, comparing an input password from a user with the password stored in the internal memory, and reading the generic password stored in the storage medium and comparing the generic password with the input password if the input password is different from the password stored in the internal memory.

2. A password processing method for storing a generic password in a detachable storage medium using a password processing apparatus comprising an internal memory for storing data, and an adaptor for writing data to and reading data from the detachable storage medium, the method comprising the steps of:
   (a) receiving a generic password and a condition to record a generic password input by a user;
   (b) determining whether the detachable storage medium is connected to the adaptor;
   (c) storing the generic password in the detachable storage medium according to the condition to record the generic password, if it is determined that the detachable storage medium is connected to the adaptor; and
   (d) storing the condition to record the generic password in the internal memory.

3. A password processing method for reading a generic password from a detachable storage medium using a password processing apparatus comprising an internal memory for storing data and an adaptor for writing data to or reading data from the detachable storage medium, the method comprising the steps of:

(a) determining whether a condition to read a generic password is stored in the internal memory;

(b) determining whether the detachable storage medium is connected to the adaptor, if it is determined in step (a) that the condition to read the generic password is stored in the internal memory;

(c) determining whether the generic password is stored in the detachable storage medium according to the condition to read the generic password stored in the internal memory if it is determined in step (b) that the detachable storage medium is connected to the adaptor; and (d) reading the generic password from the detachable storage medium if it is determined in step (c) that the generic password is stored in the detachable storage medium.

4. A password processing method for verifying a password using an internal memory for storing data, a detachable storage medium and an adaptor for writing data to and reading data from the storage medium, the method comprising the steps of:

(a) comparing an input password to a password stored in the internal memory;

(b) checking whether a condition to read a generic password is stored in the internal memory if it is determined in step (a) that the input password is different from the password stored in the internal memory; and (c) reading the generic password from the storage medium according to the condition to read the generic password, if it is determined in step (b) that the condition to read the generic password is stored in the internal memory; and (d) comparing the generic password to the input password.

* * * * *